United States Patent
Valli et al.

(10) Patent No.: US 11,902,503 B1
(45) Date of Patent: Feb. 13, 2024

(54) SYSTEM AND METHOD FOR PREPROCESSING OF FOCAL PLANES DATA FOR RENDERING

(71) Applicant: Rovi Guides, Inc., San Jose, CA (US)

(72) Inventors: Seppo Valli, Espoo (FI); Pekka Siltanen, Helsinki (FI)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/990,023

(22) Filed: Nov. 18, 2022

(51) Int. Cl.
H04N 13/395 (2018.01)
H04N 13/312 (2018.01)
G02B 30/52 (2020.01)

(52) U.S. Cl.
CPC .......... H04N 13/395 (2018.05); G02B 30/52 (2020.01); H04N 13/312 (2018.05)

(58) Field of Classification Search
CPC .. H04N 13/395; H04N 13/312; G03H 1/2294; G02B 30/52
See application file for complete search history.

(56) References Cited

U.S. PATENT DOCUMENTS 11,770,513 B1 * 9/2023 Valli .................... H04N 13/332
345/7

FOREIGN PATENT DOCUMENTS

WO 2019183211 A1 9/2019

OTHER PUBLICATIONS

Akeley et al., "A stereo display prototype with multiple focal distances," ACM Transactions on Graphics, 23(3):804-813 (2004).
Leal, "Complex spatial shaping of femtosecond pulses with phase-only spatial light modulators," PhD Thesis, Universitat Jaume I. Escola de Doctorat, (2020).
Cui et al., "Optical mapping near-eye three-dimensional display with correct focus cues," Optics Letters, 42:2475-8 (2017).
Kramida et al., "Resolving the Vergence-Accommodation Conflict in Head-Mounted Displays," IEEE Transactions on Visualization and Computer Graphics, 22(7):1912-1931 (2016).
Liu et al., "A novel prototype for an optical see-through head-mounted display with addressable focus cues," IEEE Transactions on Visualization and Computer Graphics, 16(3):381-93 (2010).
Matsuda et al., "Focal surface displays," ACM Transactions on Graphics (TOG), 36(4):1-14 (2017).

(Continued)

*Primary Examiner* — Abbas I Abdulselam
(74) *Attorney, Agent, or Firm* — HALEY GUILIANO LLP

(57) ABSTRACT

Systems and methods for rendering a 3D image are provided. The system receives texture and depth data (depth map) for an image. The system generates, based on the image data, a plurality of folded focal planes matrices. For each respective pixel matrix, the system preprocesses pixel values in the respective focal pixel plane matrix to generate a respective preprocessed matrix, wherein the respective preprocessed matrix clusters together pixel values of the respective folded focal plane matrix based on the depth data for the image. The system generates phase functions based on a plurality of the preprocessed matrices. The system configures a spatial light modulator of the SLM device in accordance with the generated phase functions. The system then provides the plurality of the preprocessed matrices as input to the SLM device to generate for display a 3D representation of the received image data.

20 Claims, 13 Drawing Sheets

(56) References Cited

OTHER PUBLICATIONS

Rolland et al., "Multifocal planes head-mounted displays," Applied Optics, 39(19):3209-15 (2000).
Romero et al., "Optical implementation of multifocal programmable lens with single and multiple axes," Journal of Physics: Conference Series, 274 (2011) 012050 (9 pages).
Zhan et al., "Multifocal displays: review and prospect," PhotoniX 1:10 (2020) (31 pages).
Kohonen, "MATLAB Implementations and Applications of the Self-Organizing Map," Unigrafia, Helsinki, Finland (2014).
Valli et al., U.S. Appl. No. 17/863,793, filed Jul. 13, 2022.
Valli et al., U.S. Appl. No. 18/071,119, filed Nov. 29, 2022.

* cited by examiner

SYSTEM AND METHOD FOR PREPROCESSING OF FOCAL PLANES DATA FOR RENDERING

BACKGROUND

This disclosure is generally directed to display of three-dimensional objects through multiple focal planes. In particular, methods and systems are provided for rearranging initial focal plane data (e.g., to cluster data based on depth) to improve performance of spatial light modulator that is configured to optically reverse the rearranged input.

SUMMARY

Head-mounted displays have been more frequently used in virtual and extended reality applications to display three-dimensional visuals to a user through use of display screens that are displayed to the eyes of a user.

In one approach, a depth-blending algorithm is used to generate multiple focal planes (MFPs) that are displayed simultaneously e.g., using a stack of transparent displays and/or using spatial light modulators (SLM) that are capable of rendering image content to varying distances, controlled by tailored phase functions.

The term "spatial light modulator" ("SLM") device refers to any suitable programmable pixel-by-pixel spatial light modulator device or any other suitable opto-electronic device or device component capable of locally directing and focusing light to different depths. In some embodiments, an SLM device works by directing light pixel by pixel, however other less precise SLM device may also be used. In some embodiment, an SLM device may also refer to a grid of parallel SLMs, or a series of SLMs rendering content in successive steps.

For example, to achieve depth-blending of any set of voxels (e.g., a set of voxels of a frame of 3D media content), the voxels may be rendered at set different distances to create blended pixels at any depth. If a voxel of the frame happens to be mapped exactly to a focal plane, then voxel representation is displayed by lighting up a single location at a single distance. If a voxel of the frame does not map exactly to a focal plane, the rendering system will render such a voxel as a blended pixel using a plurality of closest display planes (e.g., two closest display panels). Example lineal blending function are described, e.g., in K. Akeley, et al., "a stereo display prototype with multiple focal distances," CM Trans. Graph. 23, 3, 804-813, 2004 which is incorporated herein, in its entirety. When viewed together the two blended pixels create a perception representation for the voxel of the 3D media content. In one approach, an MFP display may use spatial light modulator (SLM) to locally adjust the focus to follow the depth of the virtual objects. In this approach, the rendering system generates a phase function for each individual pixel based on its depth value. The SLM uses phase functions to shift each displayed pixel to its target focal plane/distance.

In one approach, when an SLM device is used, an optical component may be used to modulate the amplitude, phase, or polarization of a light wave. The light wave may be controlled by an array of pixels, each of which can individually control the phase or amplitude of the light passing through it (transmissive SLM) or reflecting off it (liquid crystal on silicon SLM). The pixel pattern may be defined by a phase function that defines optical properties of the light modulated by the SLM. The phase functions determine the tilt (inclination) of individual liquid crystals. Spatially varying the tilt, i.e., changing the angles of neighboring crystals, corresponds to a changing curvature of a lens. The effects change the path of the incoming light so that the light is shifted (translated) or focused to a desired spatial position and distance away from the SLM device.

Both SLM translation and focusing properties have may affect rendering quality of the system. In one example implementation, minimum focal length that an SLM device can achieve is directly proportional to the number of SLM pixels used for focusing the light rays. In one example implementation, the phase change generated by each of the SLM pixels may not be totally independent of the neighboring pixels because the electric field generated for each pixel may not be totally limited to the said pixel area, but may influence one or more of the neighboring pixels.

Such problems in the example SLM device implementations can cause geometric and chromatic aberrations e.g., when the neighboring SLM pixels focus light rays at significantly different focal distances or translate them to significantly different directions.

Accordingly an improved SLM rendering system is described herein to improve the rendering quality by image processing.

When implementing an MFP rendering device, a use of many display planes/elements will result in higher rendering quality. However, it may be desirable to reduce the number of display planes/elements to help reduce computational complexity. One approach to reducing the amount of display planes is describe in detail in U.S. patent application Ser. No. 17/863,793, "SYSTEMS AND METHODS FOR REDUCING A NUMBER OF FOCAL PLANES USED TO DISPLAY THREE-DIMENSIONAL OBJECTS," (the "'793" application), which is incorporated herein in its entirety. In particular, the '793 application describes reducing pixel matrices to fewer (e.g., 2) focal plane matrices (e.g., folded focal planes or FFPs) that can be used to render a 3D image using depth-blending techniques. However, the described techniques can function with any reduced set of folded focal planes.

The improvements can be achieved by decreasing changes when either translating or focusing content (pixels) by the SLM device. Focusing properties relate to the number and order of rendering the focal planes (e.g., folded focal planes). The focusing control for adjacent pixels can be made smoother and easier for the SLM device by various preprocessing techniques described herein. For example, the pre-processing may include spatially clustering MFP pixels that are encoded to appear the same distance. The clustering effect can also be improved by further preprocessing that optionally reorganizes/maps spatially clustered pixels e.g., by using a machine learning techniques (e.g., self-organizing maps (SOM)), so that nearby pixels are translated as close to each other as possible. Further preprocessing improvements may be achieved by optionally increasing the size (upscaling) of the data defining the image. Further improvements may be achieved by optionally reducing the focal dynamics (e.g., depth range) of the image data (e.g., to reduce depth related distortions). Corresponding phase functions may then be formed for the SLM device to effectively optically reverse the preprocessing changes to the image data done during the clustering step (and other optional steps described above). In these approaches, functionality and performance of the SLM device is improved due to, among other benefits, minimizing the effect of disruption produced by using SML device attempting to project adjacent pixels into different focal depths. Because re-arranged pixels are clustered based on depth, the amount interference among adjacent clusters is reduced, resulting in better performance of the SLM device (e.g., because fewer visual artifacts are generated).

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
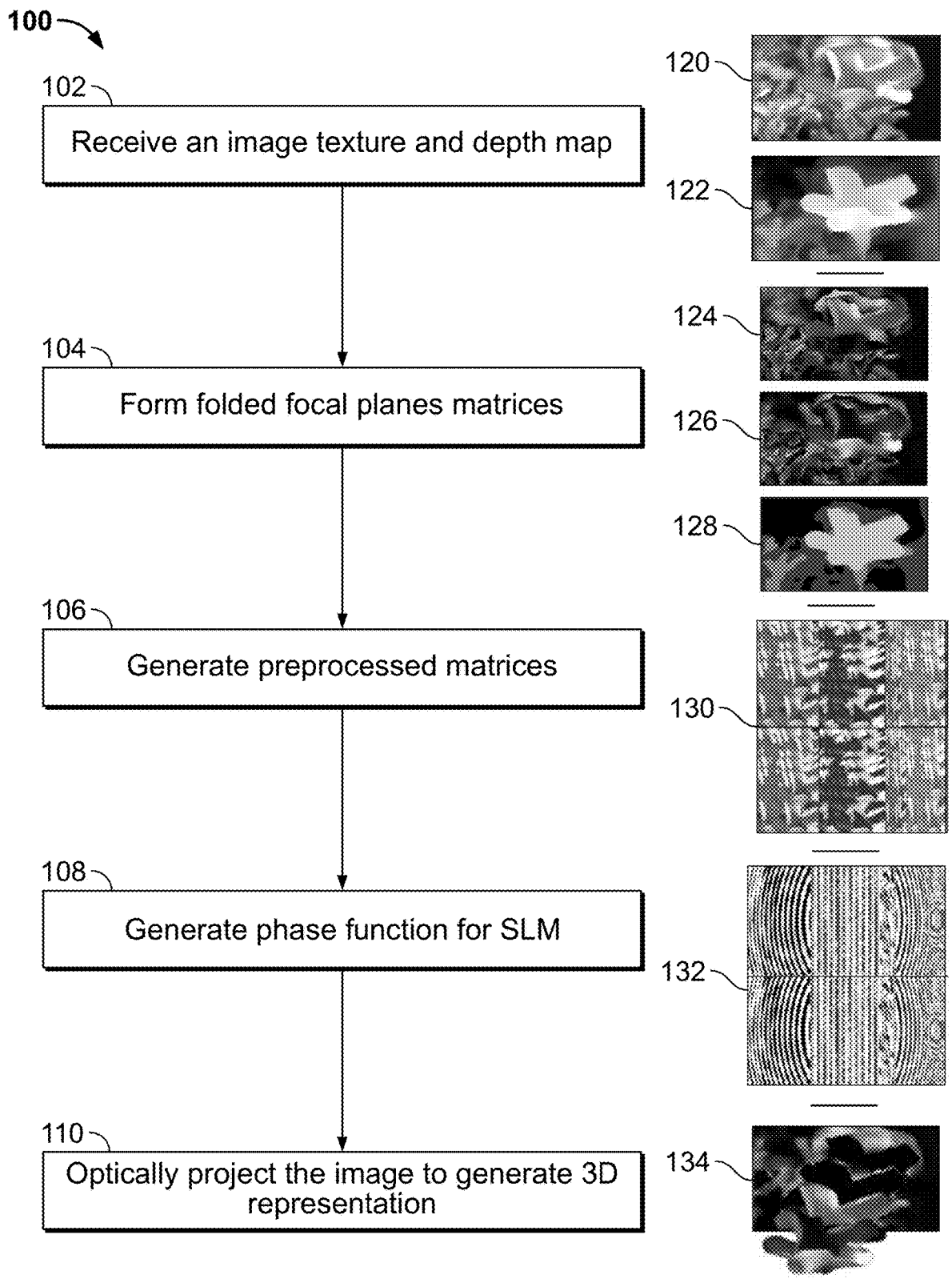
FIG. 1A depicts an example method for rendering a 3D image, in accordance with some embodiments of this disclosure.

FIG. 1A depicts an example method 100 for rendering a 3D image, in accordance with some embodiments of this disclosure.

At step 102, rendering application of a rendering system receives image data. For example, image data may comprise a frame of a video (e.g., 3D video) or other media content (e.g., 3D video game, 3D video conference, etc.). In some embodiments, image data may include a texture of an image 120 and depth data 122 (depth map) for the image data. For example, the texture data may be a table comprising luminance and/or color (e.g., RGB) matrix, where each cell in the matrix represents brightness and color of a single pixel. The depth data may be a matrix (of the same size as the texture matrix) that defines depth for each of the pixels in the texture matrix.

At step 104, the rendering application may use the image data 120 and 122 to form folded focal planes matrices (e.g., two matrices). The folded focal planes matrices may be formed by initial creation of a larger number of focal planes matrices (e.g., 5 or 10 focal planes matrices), and then reducing the number of focal planes matrices to a smaller number of folded focal planes matrices (e.g., to two folded focal planes matrices 124, 126). In some embodiments, the rendering application may use systems and methods described in the '793 application to generate the two folded focal planes matrices 124, 126. One example of such a reduction is further shown FIG. 1B, below. In one approach, the rendering application may use depth map data 122 for forming focal map data 128 for controlling the rendering distances for folded focal planes matrices 124, 126. In another embodiment, the rendering application may separately generate focal map data 128 for each of the folded focal plane matrices 124, 126. Illustrative techniques for generating the focal map data (that contains pixel-by-pixel information of the focal plane that each FFP pixel originates from) are described below in relation to FIG. 1C.

At step 106, the rendering application may generate reorganized matrices based on folded focal planes matrices 124, 126 and focal map data 128.

For example, the rendering application may rearrange each of the folded focal planes matrices 124, 126 to create preprocessed matrices 130 with more homogeneous clusters of pixels based on pixel depth provided by focal map data 128. The specific techniques for re-arranging the matrices are described in more detail below in relation to FIGS. 3A-3G. Such rearranging techniques reduce variations of both translatory and focal parameters of an SLM device that will generate for display a representation of the image data. In one approach, this preprocessing step is performed before an image is projected onto an SLM device, and the inverse mapping is made optically by configuring the SLM device to optically reverse the preprocessing (e.g., to reverse one or more of clustering, reorganizing, and upscaling). As a result, a higher quality projection by the SLM device is achieved, because of reduction in geometric and chromatic aberrations caused by large differences of the tilting angles of neighboring SLM pixels when focusing the image clusters to different focal planes.

At step 108, phase function 132 is generated based on mapping of focal planes matrices to respective rearranged matrices 130 generated at step 106 (or inverse of the mapping), and/or based on focal map data 128.

At step 110, the rendering application uses the phase function 132 to physically adjust the configuration of the SLM device such that SLM optically reverses all preprocessing (e.g., the clustering of the plurality of the folded focal plane matrices, and/or reorganizing and rescaling) to recover the representation of the received image data when light of pixels defined by focal planes matrices 124, 126 are reorganized and projected through the SLM device (e.g., in tiled or time-multiplexed manner).

Figure 1B:
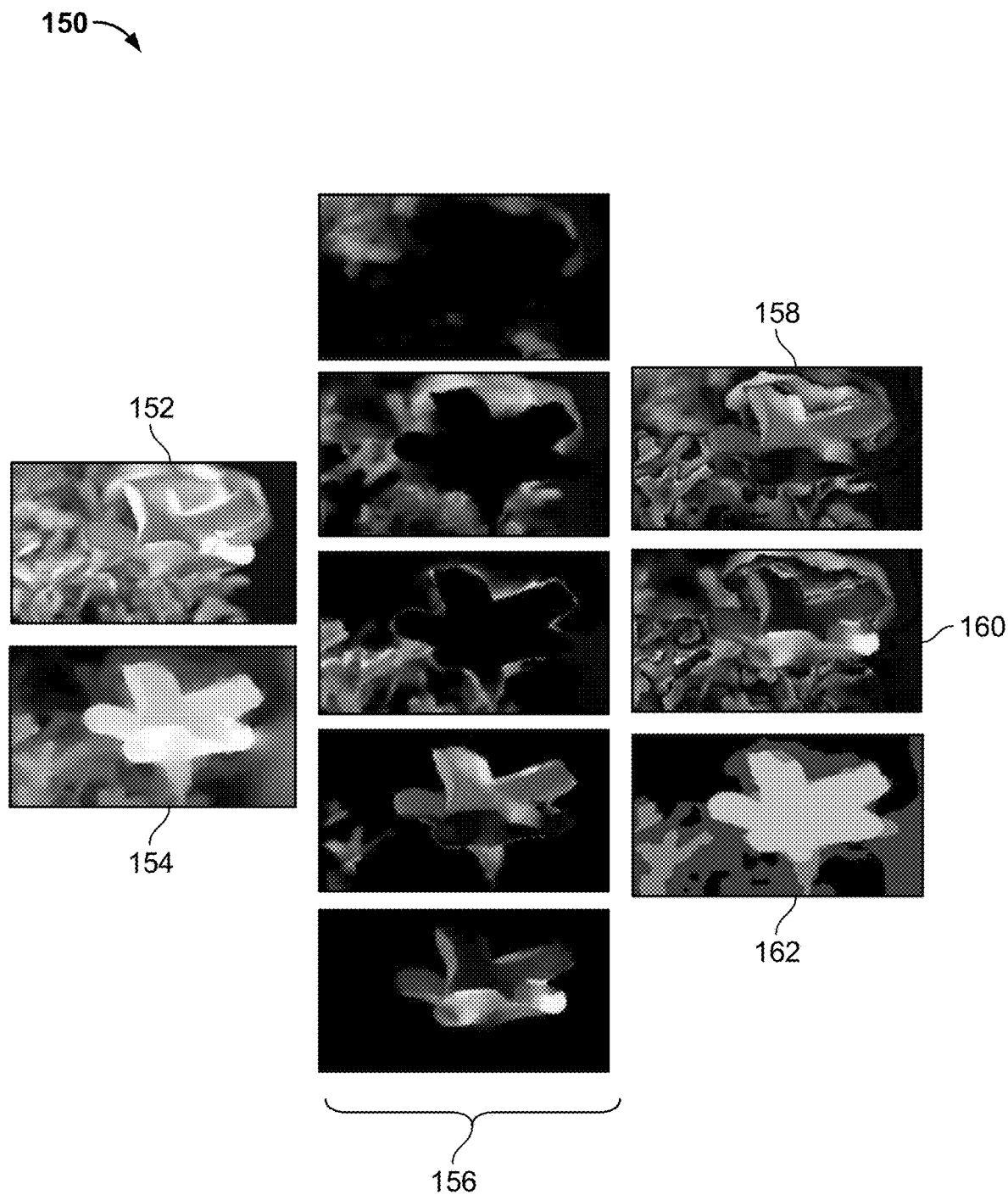
FIG. 1B depicts an example method for reducing a number of focal planes for display of a three-dimensional image, in accordance with some embodiments of this disclosure.

FIG. 1B depicts an example method for reducing a number of focal planes for display of a three-dimensional image, in accordance with some embodiments of this disclosure.

For example, FIG. 1B shows example details of step 104 of FIG. 1A. For example, texture 152 and depth data 154 may serve as input image data to be displayed. The corresponding focal map 162 serves both folded focal plane data 158, 160 after being shifted by a distance between two adjacent folded focal planes (cf. '793 application). As shown, initially five focal planes matrices 156 are generated before being reduced to data for two folded focal planes 158, 160, and focal map data 162. For example, folded focal plane data 158, 160 may be geared using a method described in the '793 application (e.g., as shown in FIG. 4 of the '793 application) and in FIG. 1C.

Figure 1C:
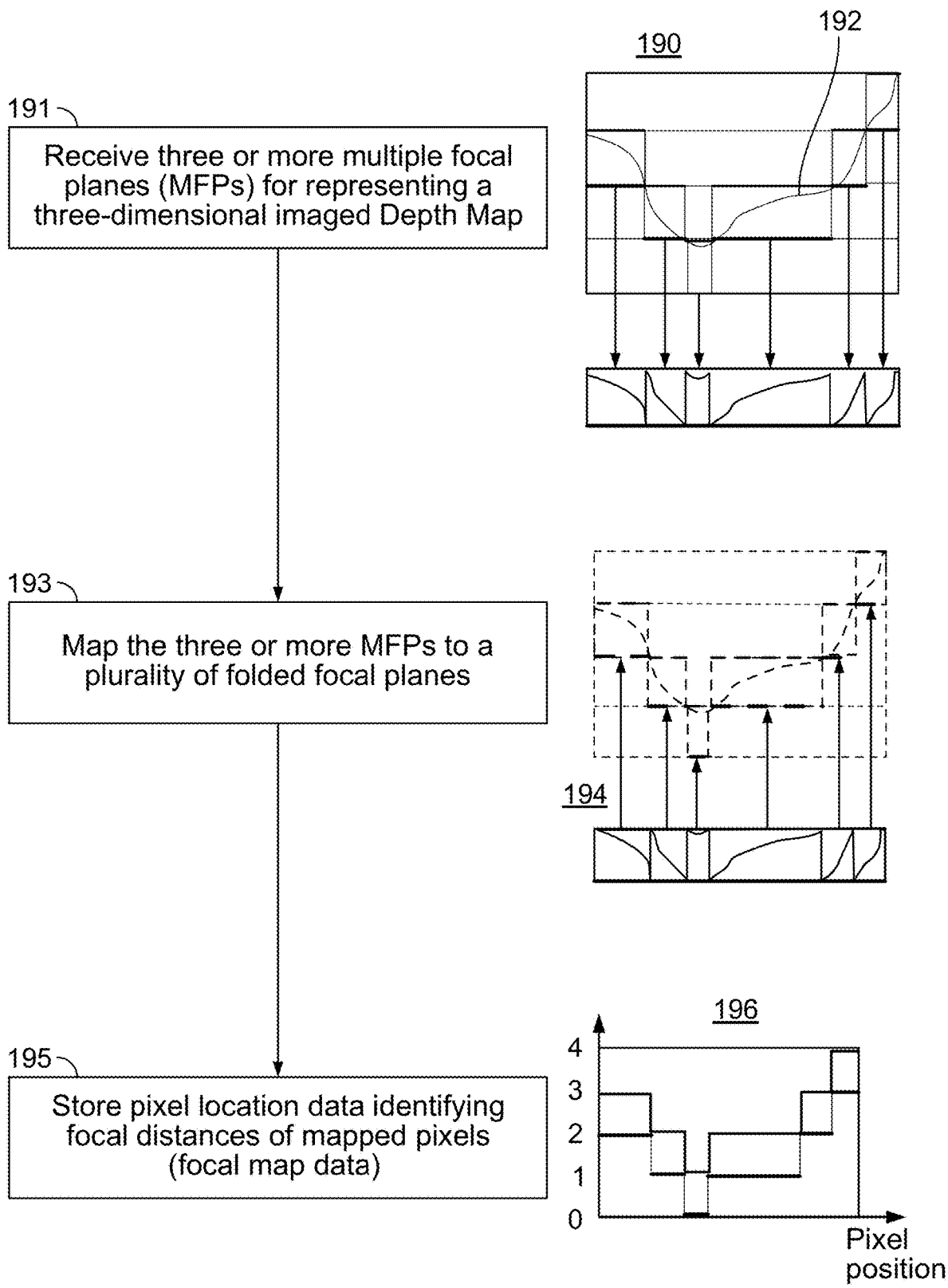
FIG. 1C depicts another example method for reducing a number of focal planes for display of a three-dimensional image, in accordance with some embodiments of this disclosure.

FIG. 1C depicts an example method for reducing a number of focal planes for display of a three-dimensional image, in accordance with some embodiments of this disclosure. In particular, FIG. 1C depicts an example method for reducing a number of focal planes for display of a three-dimensional image. At step 191, three or more multiple focal planes (MFPs) for representing a three-dimensional image are received. The focal planes may be implemented using a stack of displays, with each display corresponding to one of the planes. The MFPs may be generated from data representing a three-dimensional image (e.g., a 3D frame of 3D media content) using a depth-blending algorithm. In some embodiments, the MFPs are received from an external computing device.

MFPs 190 comprise a graphical representation of a cross-section of a three-dimensional image displayed across a plurality of focal planes. Curve 192 depicts the intended appearance of focal depths of the cross-section of the three-dimensional. Each section of curve 192 is represented by pixel values on one or more focal planes. For instance, the first section of curve 192 is generated from pixel luminance values on the third and fourth focal planes from the front (bottom) with the location of a pixel of the final image being dependent on a magnitude of the luminance values of that pixel in the third focal plane and the fourth focal plane. In some instances, a pixel luminance value may only exist on one focal plane, such as at the locations where the line moves between focal planes. In some instance, a pixel luminance value may exist across more than two focal planes, such as when a depth blending algorithm that is used to generate the MFPs blends a pixel value across more than two focal planes.

At step 193, the first plurality of focal planes is mapped to a second plurality of folded focal planes. The second plurality of folded focal planes to which the first plurality of focal planes comprises at least one less focal plane than the first plurality of focal planes. In some embodiments, the first plurality of focal planes is mapped to a total of two folded focal planes, such as when pixel luminance values for any given pixel location only exist on a maximum of two focal planes.

FIG. 1C depicts an implementation where five focal planes are mapped down to two folded focal planes. Each portion of the curve 192 is represented in the five focal planes 190 as pixel luminance values on a maximum of two folded focal planes. For each pixel location with pixel luminance values in two focal planes, the pixel luminance value of the backmost folded focal plane is mapped to the first of mapped focal planes 194 and the pixel luminance value of the frontmost folded focal plane is mapped to the second of the mapped focal planes.

For each pixel location with a pixel luminance value in only one of the focal planes, the pixel luminance value is mapped to one of the backmost folded focal plane or frontmost folded focal plane according to some embodiments (e.g., such that its final rendering distance is not changed farther or closer). In one approach, each pixel location with a pixel luminance value in only one of the focal planes may be included into a folded frontmost plane of the focal planes 194. In another approach, each pixel location with a pixel luminance value in only one of the focal planes may be included into a backmost folded focal plane of the focal planes 194. In yet another approach each of such pixel location may be included in the frontmost folded focal plane or the backmost folded focal plane at random or using another suitable selection technique.

At step 195, focal map data, i.e., pixel location data identifying focal distances of mapped pixels is stored. For example, the rendering application may store, for each mapped pixel, data identifying a focal plane from which the pixel was mapped. Graph 196 depicts a graph of pixel location values that identify a focal plane from which the pixels were mapped, starting at focal plane 0 and ending at focal plane 4. While pixel location values are depicted as identifying the focal plane, in other embodiments the pixel location values may comprise the focal distance of the mapped focal plane. Alternatively, the rendering application may store data identifying, for each focal plane, the focal distance of the focal plane. While FIG. 1C depicts the pixel location values as a graph, in some embodiments the pixel locations values are stored in a table and/or integrated into a phase function equation for rendering a three-dimensional image.

Referring back to FIG. 1A formation of folded focal planes matrices at step 104 may be performed as described in FIG. 1C. In addition to all shifted depth blended segments shown in FIG. 1C, focal distances (focal/rendering map) of the original MFP stack are stored to be used by the rendering application. Exemplary focal control data is illustrated in chart 196. This data may be used by rendering application when re-rendering the two FFPs of FIG. 1C, e.g., as shown by arrows in charts 190 and 194. Accordingly, the term "focal map" may refer to an image that contains pixel-by-pixel information of the focal plane that each FFP pixel originates from. In another embodiment, without the focal control, image pixels may be reconstructed at the distances of a folded depth map (e.g., as shown by line 192 in FIG. 1C).

Figure 2:
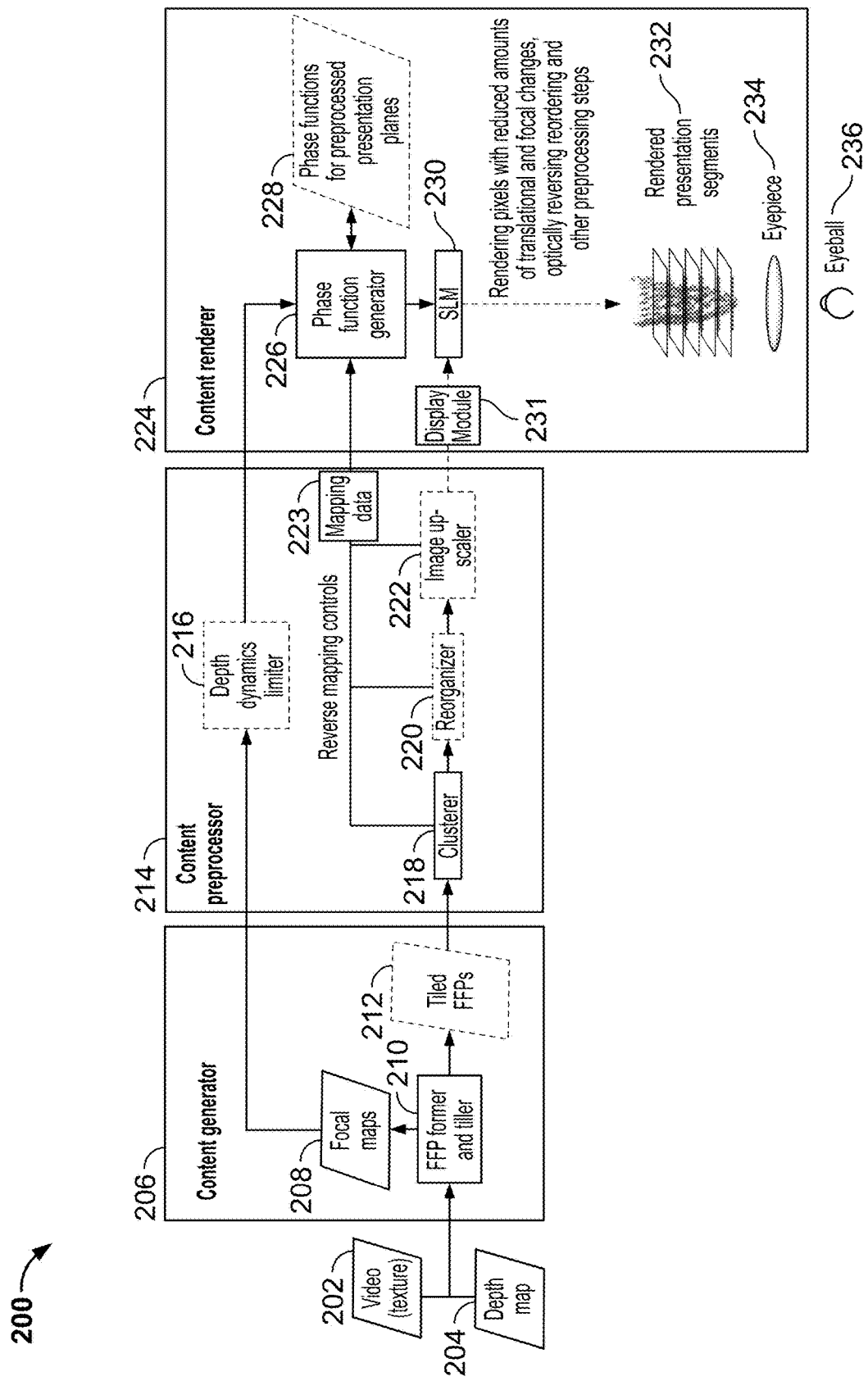
FIG. 2 depicts another example method rendering a 3D image, in accordance with some embodiments of this disclosure.

FIG. 2 depicts another example method 200 for rendering a 3D image, in accordance with some embodiments of this disclosure. In this embodiment, the rendering application may use several modules: content generator 206, content pre-processor 214, and content renderer 224 to generate for display a 3D image based on video texture 202 and depth map 204. Each of the modules 206, 214, 224 may be embodied in software (stored in non-transitory memory), hardware, or any combination of the two. In some embodiment, method 200 may be performed for any number folded focal plane data sets generated based on inputs 202, 204.

Content generator module 206, may accept an input of video texture 202, and depth map 204 (e.g., elements 152 and 154 of FIG. 1B). Inputs 202 and 204 may be provided by a local application (e.g., when playing a locally stored 3D video or playing a 3D video game) or provided as a part of a stream by an external server via any suitable network.

At block 210, content generator module 206 may generate data for multiple focal planes (MPFs), e.g., as pixel matrices that define luminance and/or color values of pixels in a 3D image. Any number of matrices may be generated (e.g., 5 focal plane matrices 156 and two folded focal plane matrices 158, 160 of FIG. 1B). In one approach, number of MFPs may be reduced, e.g., by using techniques of the '793 application and/or techniques shown in FIGS. 1B and 1C to generate a reduced set of folded focal planes (FFPs). In some embodiments, the produced FFPs may be tiled together to produce a single image (e.g., as shown in element 402 of FIG. 4A). The tiled FFP matrices may then be provided to content preprocessor 214. Additionally, one or more focal maps (e.g., focal map data 196 for controlling the rendering distances for folded focal planes matrices 124, 126) may be sent to the content preprocessor 214. In some embodiments, the focal maps for the FFPs are generated based on depth map 204.

The content preprocessor 214 may accept as input the tiled FFPs matrices 212 and the focal maps 208. The content preprocessor 214 may use a clusterer 218 to cluster pixel values (e.g., by collecting the pixel values) in the tiled FFPs matrices to generate a respective clustered matrix, wherein the clusterer 218 clusters (e.g., by collecting together) together pixel values of the respective folded focal plane matrix based on the depth data for the image (e.g., to cluster together in respective regions pixels that are at the same or similar depth). Example techniques for such clustering are described in more detail with respect to FIGS. 3A and 3D.

The content preprocessor 214 may optionally use a reorganizer 220 to further reorganize pixels of the clustered matrix created by the clusterer 218 to further reduce the distances of pixels in the clustered matrix that were proximate in the tiled matrixes 212 produced by content generator 206. The reorganizer 220 may utilize a machine learning algorithm, that was trained to penalize an increase in distance in the respective reorganized matrix between pixels that were adjacent in the respective pixel matrix of a focal plane (focal pixel plane matrix). Example techniques for such reorganizing are described in more detail with respect to FIGS. 3B and 3C. The reorganizer is optional and may be omitted.

The content preprocessor 214 may use an image up-scaler 220 to proportionally enlarge the preprocessed matrix produced by clusterer 218 (and or reorganizer 220). Any suitable image scaling algorithm may be used (e.g., Nearest-neighbor interpolation, Sinc and Lanczos resampling, etc.) to achieve proportional enlargement of the preprocessed matrix. The image up-scaler 220 is (in some embodiments) optional and may be omitted from the content preprocessor 214. In some embodiments, image up-scaler 220 functionality may be performed before clustering.

The content preprocessor 214 may then provide the preprocessed matrix and the mapping data 223 of the original tiled matrices 212 to the phase function generator 226 of the content renderer 224.

The content preprocessor 214 may also provide depth dynamics limits information 216 to adjust phase functions that are generated by content renderer 224. The physical SLM renderer 230 may be controlled in several different ways to achieve pixel translation and focal changes (e.g., via electrical control). The limits may vary between different models of SLM devices. Accordingly, content preprocessor 214 may store information for SLM 230 that may describe limits to the range of the phase function. Such limit information 216 may be optionally provided to the phase function generator 226 of the content renderer 224.

The content renderer 224 may include a phase function generator 226 that is configured to accept as input the preprocessed matrix produced by module 218 (that has been optionally modified by modules 220 and/or 222) and data describing the mapping of the reorganized matrix back to original tiled matrix 212. Phase function generator 226 may also accept as input phase function limiter information 216. Phase function generator 226 then generates the phase functions that would enable the SLM to optically reverse all pre-processing (e.g., clustering and/or reorganization/upscaling) as digitally performed by modules 218, 220, 222.

The content renderer 224 may then configure the SLM device 230 according to the generated phase function (e.g., via electrical controls). Then, the reorganized matrix may be generated for display (e.g., via display module 231) and fed through the SLM 230 to create presentation of pixels at different depths 232. Because the SLM optically reverses the pre-processed matrix of step 218, the output is a representation of the focal places formed by model 210. The rendered rays of light from a display module 231 (e.g., a 2D display) are collected by lens 234 and provided to user's eye 236. The process of using SLM to achieve a display of 3D image representation of data 202, 204 is further described with respect to FIGS. 4A and 4B.

FIGS. 3A-3G depicts various example of mapping pixel values with a rearranged pixel data structure, in accordance with some embodiments of this disclosure. The rearrangements shown FIGS. 3A-3G may be performed as part of step 106 of FIG. 1A or as part of modules 218, 220, 222 of FIG. 2.

Figure 3A:
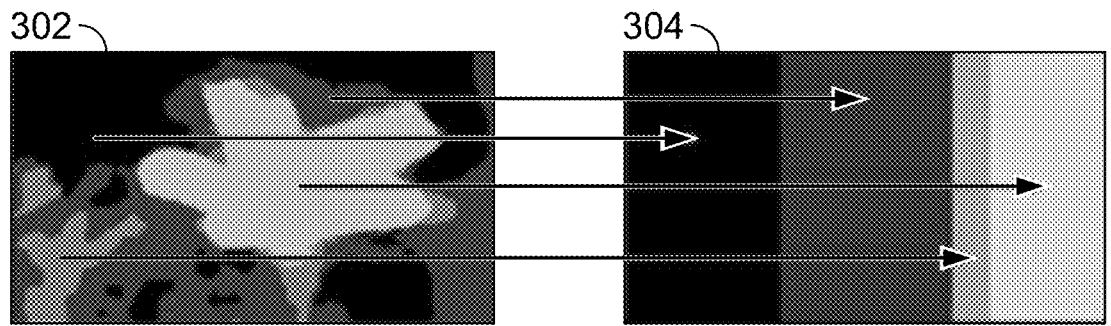
FIG. 3A depicts an example of mapping pixel values with a preprocessed pixel data structure, in accordance with some embodiments of this disclosure.

In the example shown by FIG. 3A, pixel clusters (focal segments) in image 302 are mapped into image 304, such that pixels that were at each respective depth level in image 302 end up mapped to the same (e.g., rectangular region) in image 304. For example, image 302 may correspond to focal maps 212 of FIG. 2 that are tiled together. In some implementations, pixels of tiled focal planes 302 are mapped (clustered) as indicated by image 304, such that pixels that were at respective depth level end up mapped to the same respective polygonal (e.g., rectangular) region indicated by image 304.

In some embodiments, pixels in each focal segment (shown with one shade of grey in the image 302) are written, by a rendering application, in target columns as shown by the arrows from image 302 to image 304. In some embodiments, the area of each column in image 304 is the same as the total area taken by corresponding pixel depth segment in the focal map image 302. In some embodiments, the pixel clusters of image 304 cover the same area and number of pixels as corresponding segments of pixels in image 302.

Figure 3B:
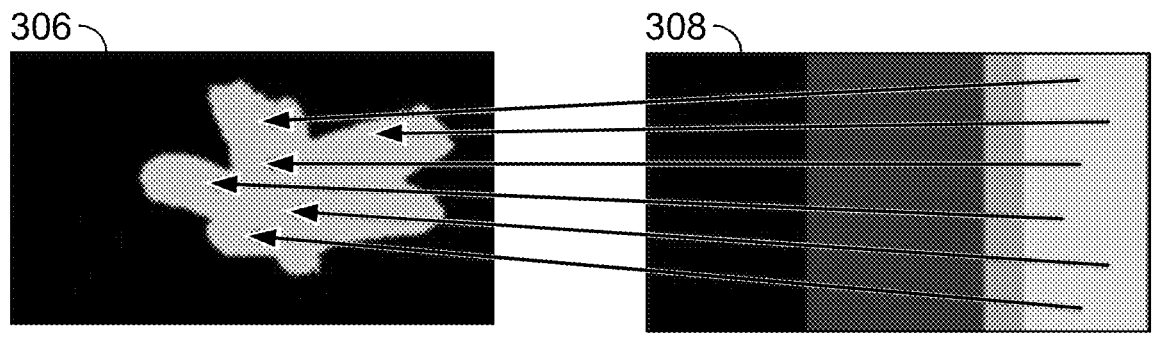
FIG. 3B depicts an example of mapping pixel values with a preprocessed pixel data structure, in accordance with some embodiments of this disclosure.
Figure 3C:
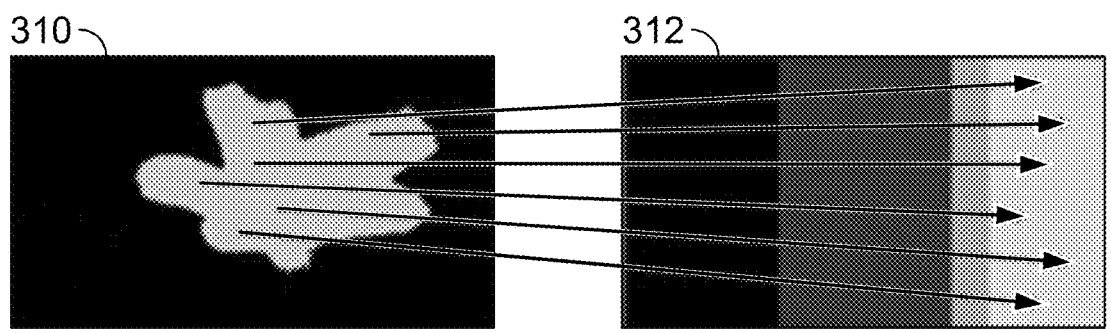
FIG. 3C depicts an example of mapping pixel values with a preprocessed pixel data structure, in accordance with some embodiments of this disclosure.
Figure 3D:
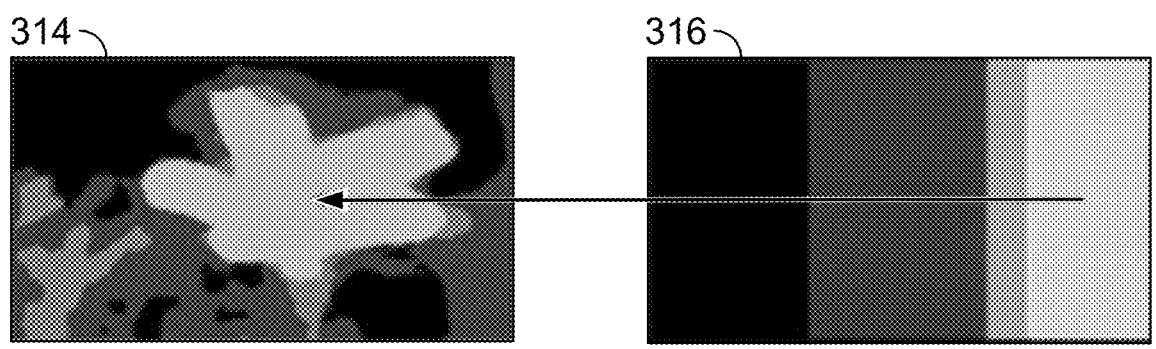
FIG. 3D depicts an example of mapping pixel values with a preprocessed pixel data structure, in accordance with some embodiments of this disclosure.

In the example shown by FIG. 3C, each pixel in a depth cluster of image 310 is mapped to a unique position inside the corresponding pixel cluster image 312. In particular, data (e.g., address mapping) of each of these pixel mappings is stored in a cluster table (or another suitable data structure). For example, if pixel at location {10,54} in image 310 was mapped to location {200, 138} (where the numbers indicate horizontal and vertical location of the pixel) in image 312, both of the value pairs may be stored in a cluster table in association with each other (e.g., as data block [{10,54}->{200, 138}]). In one approach the position within each column (e.g., of image 304) may be selected at random. The pixels may retain their luminance and color values after reorganization. This data may be eventually used by an SLM device (configured with an appropriate phase function) to optically direct pixel clusters of images 308 and 316 back into their original positions, 306, 314 respectively as shown by FIGS. 3B and 3D.

While a polygonal (e.g., rectangular) shape is shown for pixel clusters in images 304 and 312, any other suitable pixel cluster shape may be used. For example, the clusters may circular or elliptically shaped and nested within one another. In another examples, the clusters may be hexagonal.

Figure 3E:
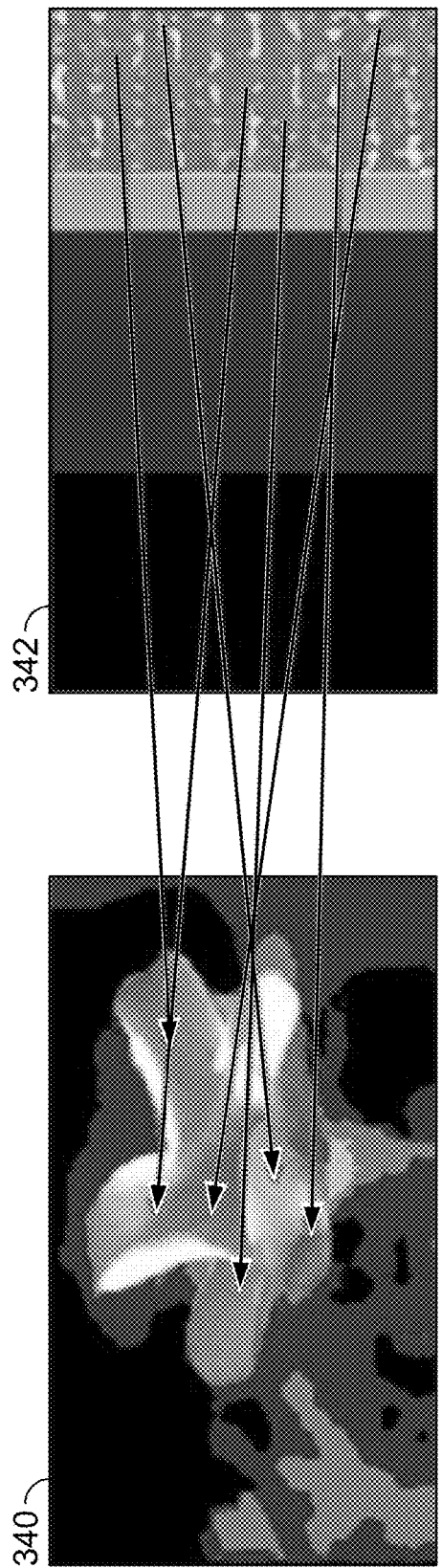
FIG. 3E depicts an example of mapping pixel values with a preprocessed pixel data structure, in accordance with some embodiments of this disclosure.
Figure 3F:
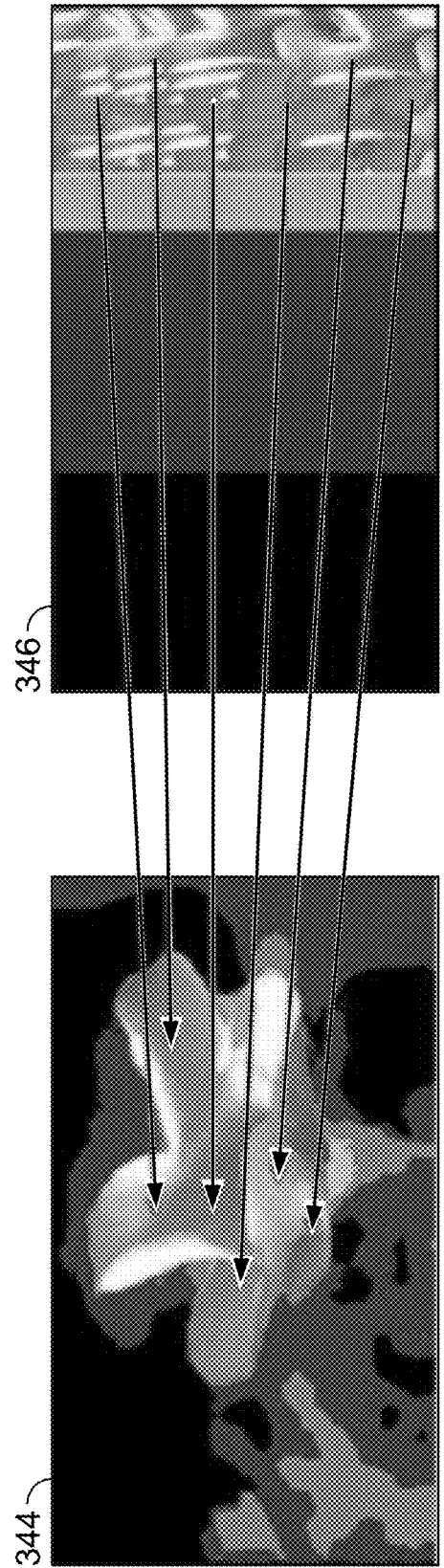
FIG. 3F depicts an example of mapping pixel values with a preprocessed pixel data structure, in accordance with some embodiments of this disclosure.

Instead of a random or a processing-order-based (e.g., row-by-row processing or boustrophedonic processing) mapping of pixels of the same depth into each depth cluster, the rendering application may cluster the pixels in a more homogeneous manner as shown, for example, in FIG. 3F. Element 340 and 342 of FIG. 3E depict back mapping of pixel clusters when additional ordering is not used, and correspondingly elements 344 and 346 of FIG. 3F depict back mapping when using such an improved ordering.

In one approach the preprocessed matrix (e.g., as shown in images 304, 312) may be further processed so that nearby pixels in the clustered image 342 originate from nearby pixels in the original image (e.g., image 340). As shown in FIG. 3F, reordered clusters in image 346 indicate increased correlation between pixel addresses for image 344 that the mapping between pixels in image 342 and image 340.

In one approach, each pixel $\{x_i, y_i\}$ of image 340 that was at certain depth is translated into a cluster position $\{x_j, y_j\}$ of image 342. In the shown example, the aspect ratio of the original image 340 and the "cluster image" 342 are kept the same, and the number of pixels is equal. However, in other embodiments, dimensions and scale of "cluster image" 342 may be different (e.g., upscaled or distorted).

To determine the translation destination, the rendering application may begin with certain translations (e.g., random ones) and to calculate the sum of distances between each translation of a pixel from image 340 into image 342. The distance may be computed using any suitable technique (e.g., Euclidian, absolute distances, Chebuchev distance, etc.)

The rendering application may then modify the translations to reduce the total distance. In one approach, the modification may be performed iteratively until the sum of distance stops decreasing. In one approach, the rendering application may calculate an ideal reorganization that results in minimal total distance while keeping each translation into its own cluster (e.g., rectangles or polygons of image 342). The resulting transition may be stored (e.g., as a table) and used along with focal map 208 (and/or focal map 302) to generate needed phase functions for the SLM device to undo the translations.

In another embodiment, as shown in FIG. 3F, a machine learning algorithm is used, trained to penalize an increase in distance in the respective reorganized clusters (as an example, see rightmost column in image 346). Pixels in the rightmost cluster in image 346 are adjacent to each other and belong to the same focal segment, as illustrated by image 344.

Figure 3G:
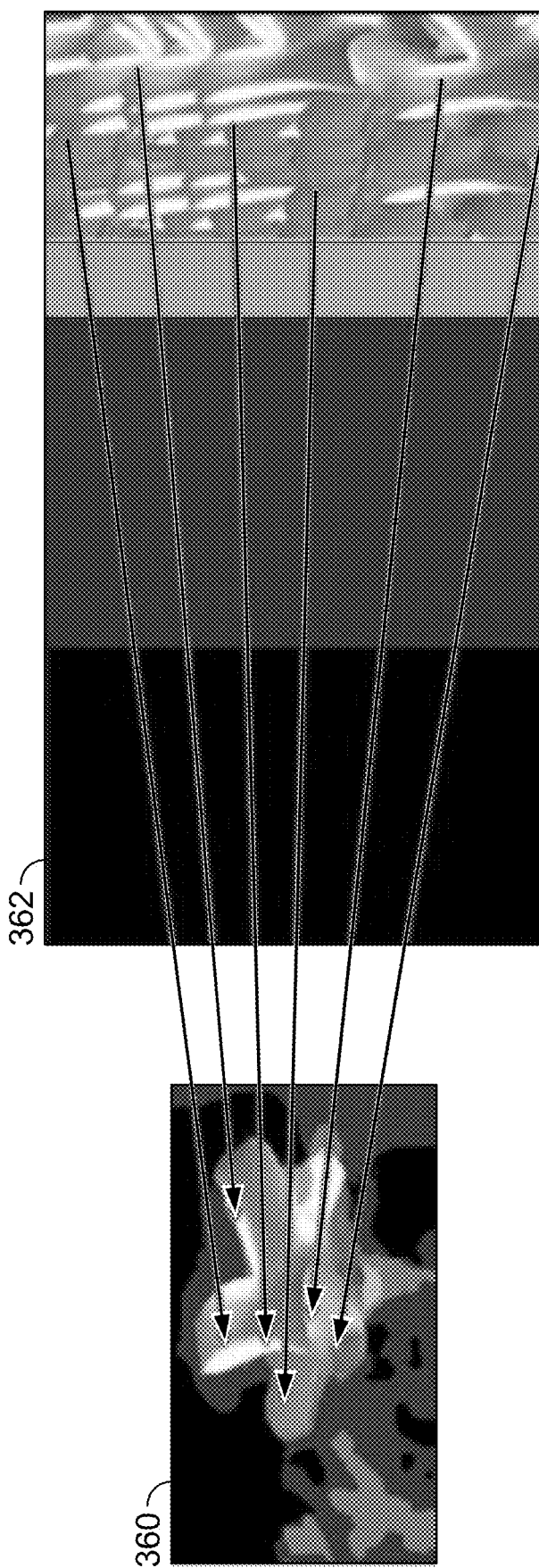
FIG. 3G depicts an example of mapping pixel values with a preprocessed pixel data structure, in accordance with some embodiments of this disclosure.

In one implementation the rendering application may optimize the mapping between segments (e.g., rectangular or polygonal sections if image 346) of depth clusters in image 344 using self-organized map (SOM) techniques. SOM techniques are capable of reorganizing pixels on a 2D plane according to set weight or gravity function. The weight or gravity function may be defined as distance function describe above, which consists of a suitable penalty for placing pixels far from their original neighbors in the original image. Reorganizing pixels (e.g., by SOM) results with more homogeneous and easy mappings for SLM, as depicted in FIGS. 3G and 3F. This distance or error function may also take the actual mapping/distortion properties of the SLM into account. Suitable SOM techniques are described in Kohonen, Teuvo. "MATLAB implementations and applications of the self-organizing map." Unigrafia Oy, Helsinki, Finland 2 (2014), which is herein incorporated by reference in its entirety.

In another embodiment, as shown in FIG. 3G, the initial image 360 (in addition to preprocessing described above in FIGS. 3A-3G) is scaled to be proportionally larger. Any suitable image scaling algorithm may be used (e.g., Nearest-neighbor interpolation, Sinc and Lanczos resampling, etc.) to achieve proportional enlargement of the preprocessed matrix created from image 360 to image 362. Arrows from pixel cluster 362 to element 360 show back-mapping from reorganized and scaled elements to the original position.

Figure 4A:
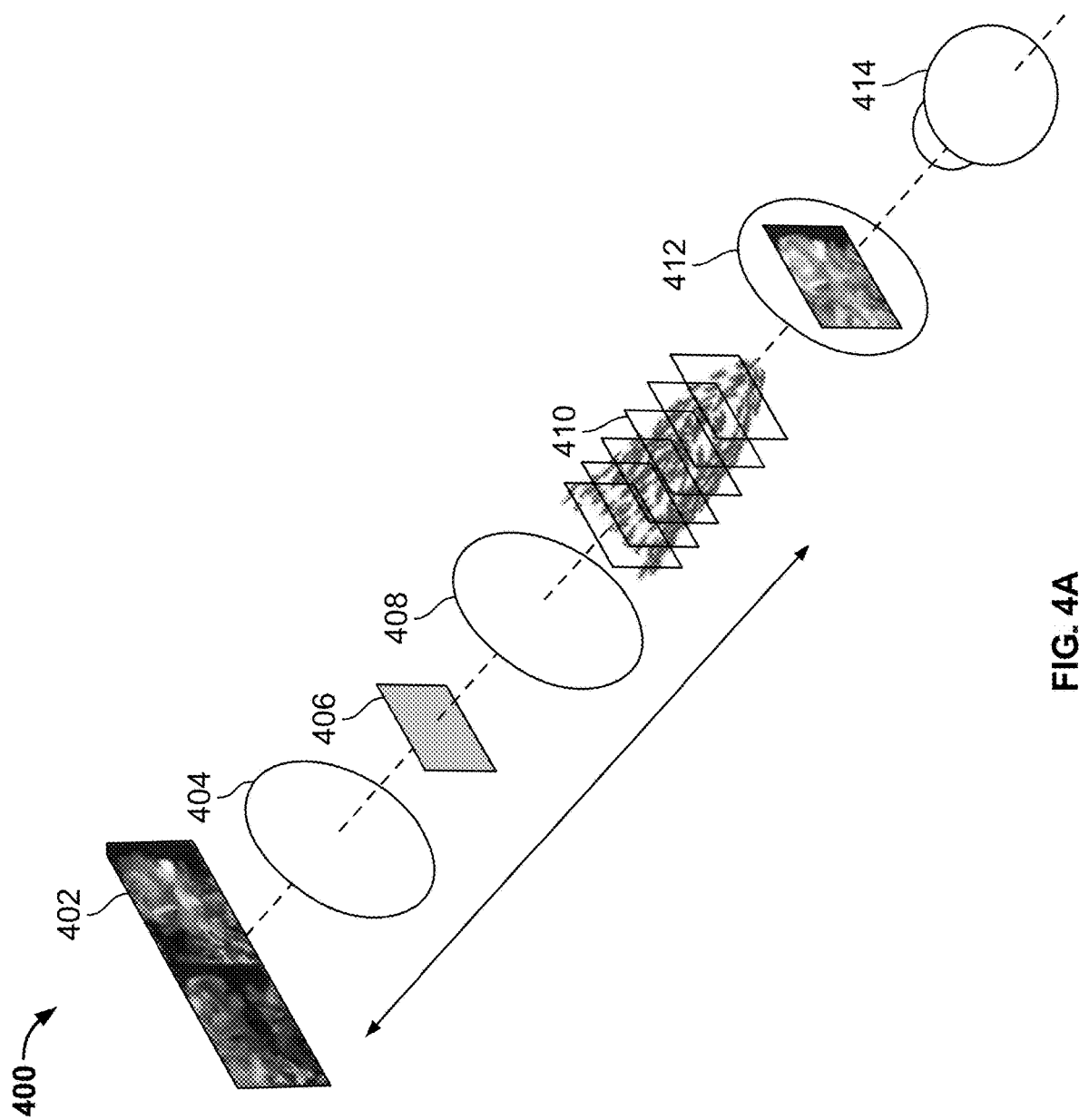
FIG. 4A depicts an example system for rendering an image using pixel values, in accordance with some embodiments of this disclosure.

FIG. 4A depicts an example system 400 that can be used to render an image using pixel values. Display screen 402 comprises a display configured to display the mapped pixel values. As depicted in FIG. 4A, display screen 402 comprises two displays, one for each tiled mapped focal plane (e.g., as created by module 210). In implementations where the pixel values are mapped to more than two focal planes, display screen 402 may be configured to display the higher number of focal planes. Light emanating from display screen 402 is collimated by lens 404. A spatial multiplexing unit (SMU, for example one or more SLMs) 406 functions as a multifocal off-axis Fresnel lens that adds quadratic and linear phase terms to an incident wavefront. The quadratic phase terms can axially shift pixels to the designated depths, while the linear phase terms can laterally shift the centers of pixels to the optical axis. As a result, the pixels of the sub-panel images can be mapped to different axial locations and laterally aligned at the output end. Using SMU technology for shifting portions of the image, the system can use the mapping data to determine where to shift each of the pixels and modify the SMU to shift the pixels to their original locations.

The light that passes through SMU 406 is collimated by lens 408 to create optically mapped pixels 410 at the different depths. The final output image is collected by eyepiece 412 and displayed to a user 414. In some embodiments, a reflective SLM device may be used to achieve the effect shown FIG. 4A.

Figure 4B:
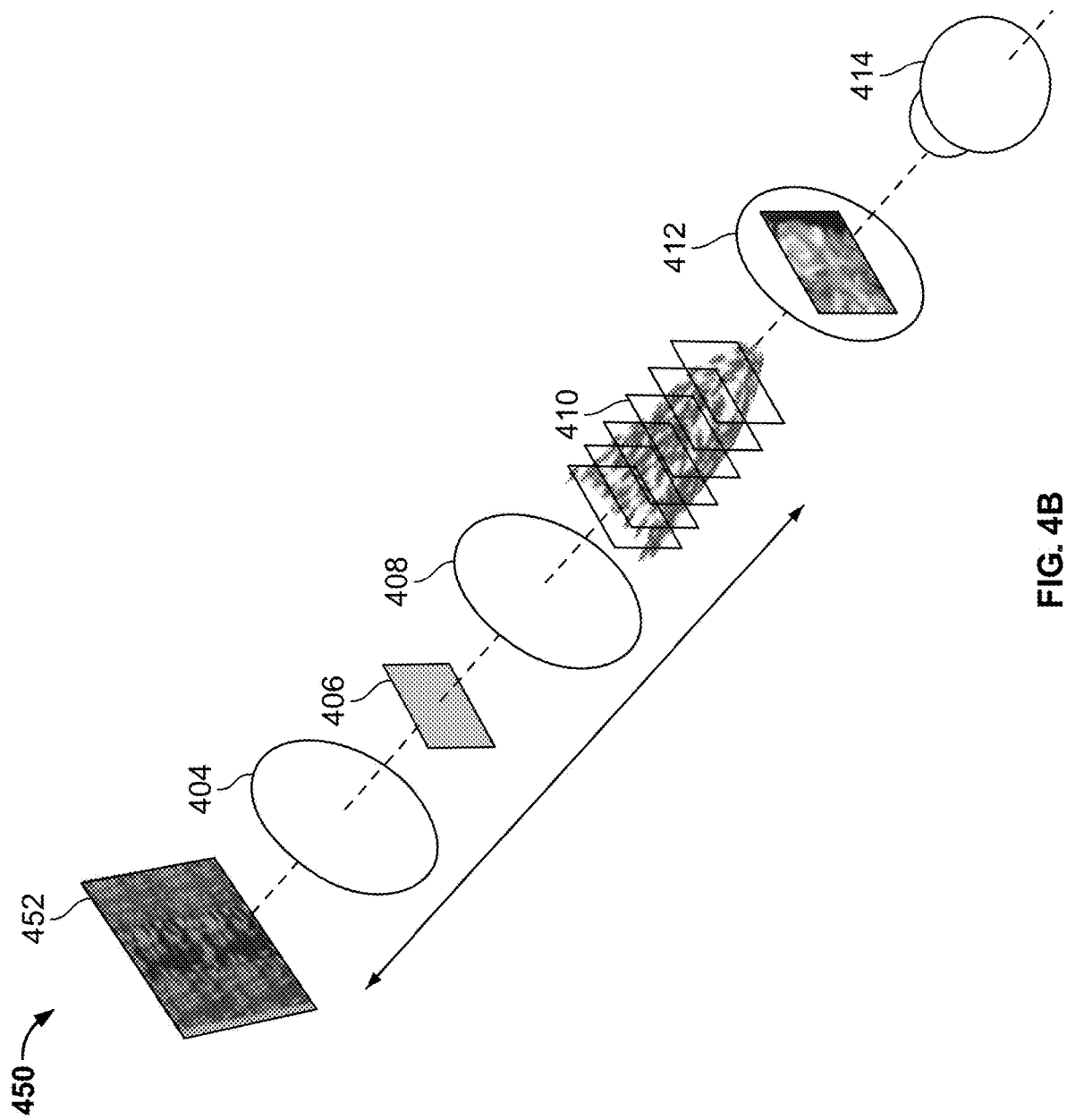
FIG. 4B depicts another example system for rendering an image using pixel values, in accordance with some embodiments of this disclosure.

FIG. 4B depicts another example system 450 that can be used to render an image using pixel values of pixel matrices that was preprocessed in accordance to one or more methods described in relation to FIGS. 1-3. Display screen 452 comprises a display configured to display the preprocessed matrices (e.g., spatially tiled, or time multiplexed). For example, the matrices may have been clustered, and optionally reorganized and upscaled (e.g., using modules 218, 220, and 222 of FIG. 2). In one example, display 452 may display images created in step 106 of FIG. 1A.

Light emanating from display screen 452 is collimated by lens 404. A spatial multiplexing unit (SMU) 456 functions as a multifocal off-axis Fresnel lens that adds quadratic and linear phase terms to an incident wavefront. The quadratic phase terms can axially shift pixels to the designated depths, while the linear phase terms can laterally shift the centers of pixels to the optical axis. The phase terms may have been calculated to optically reverse all preprocessing (e.g., clustering, and optional reorganization and upscaling). For example, the phase terms may be terms 132 computed in step 108 of FIG. 1 or in module 226 of FIG. 2. As a result, the pixels of images can be mapped to different axial locations and laterally aligned at the output end. Using SMU technology for shifting portions of the image, the system can use the mapping data to determine where to shift each of the pixels and modify the SMU to shift the pixels to their original locations in the matrix of an image before it's processed by modules 218, 220, 222.

The light that passes through SMU 456 is collimated by lens 408 to create optically mapped pixels 410 at the different depths. The final output image is collected by eyepiece 412 and displayed to a user 414. In some embodiments, a reflective SLM device may be used to achieve the effect shown FIG. 4B.

Figure 5:
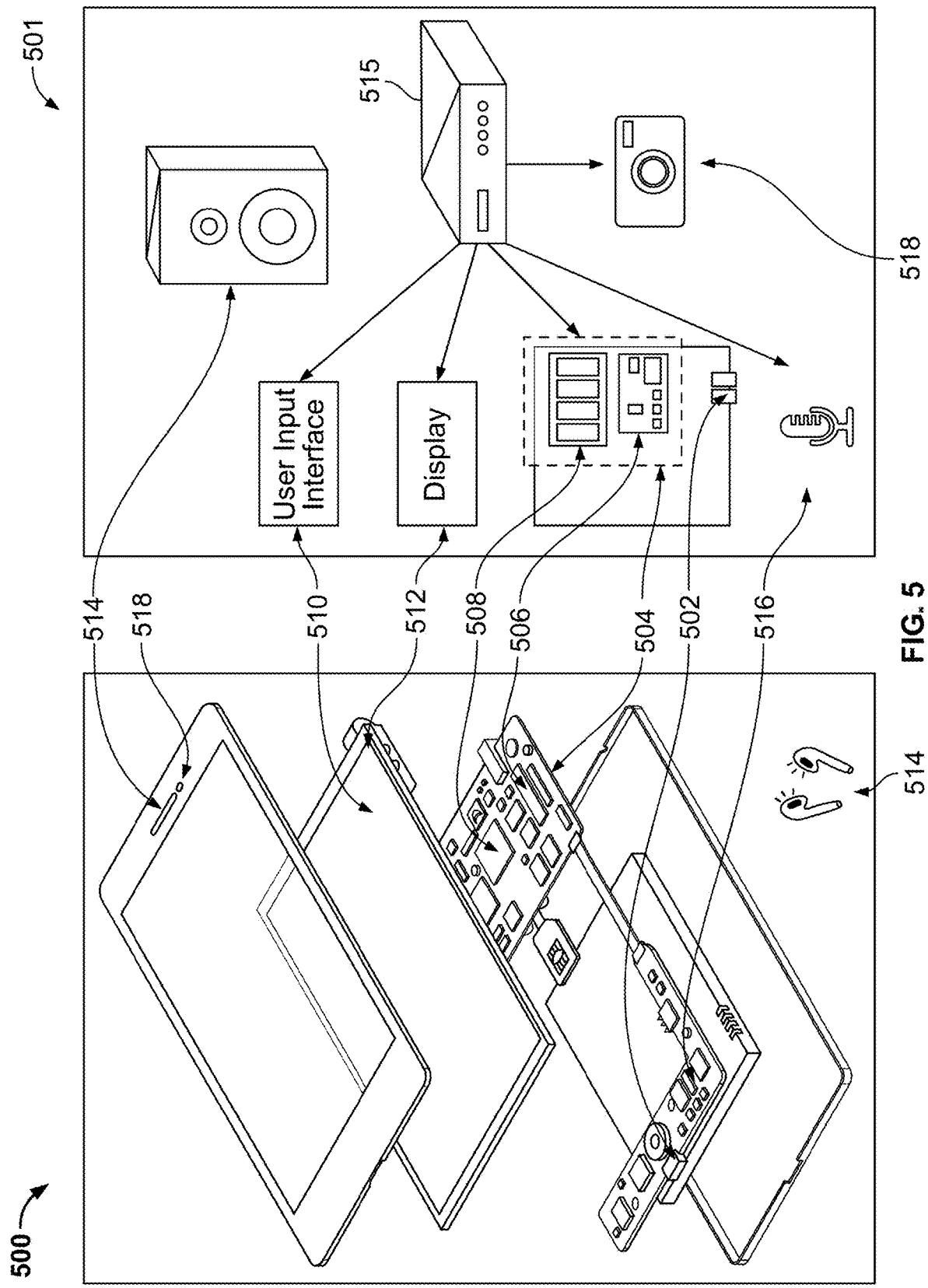
FIG. 5 shows generalized embodiments of illustrative user equipment devices which may perform the functions described herein.
Figure 6:
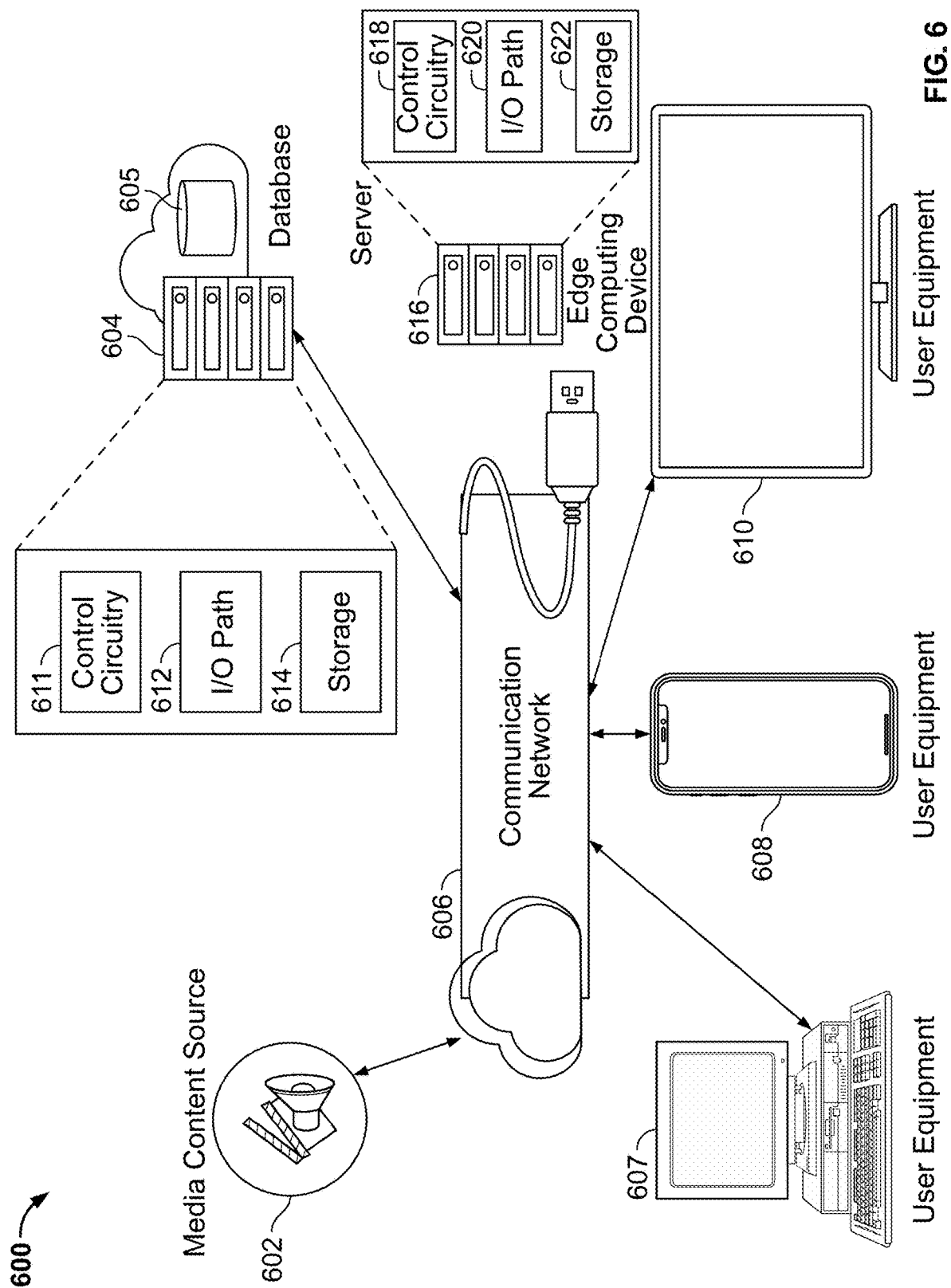
FIG. 6 is a diagram of an illustrative system for encoding/decoding, in accordance with some embodiments of this disclosure.

FIGS. 5-6 depict illustrative devices, systems, servers, and related hardware for image encoding/decoding. FIG. 5 shows generalized embodiments of illustrative user equipment devices which may perform the functions described herein. User equipment device 500 may be a smartphone device, a tablet, a virtual reality or augmented reality device, or any other suitable device capable of processing video data. In another example, user equipment device 501 may be a user television equipment system or device. User television equipment device 501 may include set-top box 515. Set-top box 515 may be communicatively connected to microphone 516, audio output equipment (e.g., speaker or headphones 514), and display 512. In some embodiments, display 512 may be a television display, computer display or a head mounted display comprising a stack of displays. In some embodiments, display 512 may contain an SLM device as shown in FIGS. 4A and 4B. In some embodiments, set-top box 515 may be communicatively connected to user input interface 510. In some embodiments, user input interface 510 may be a remote-control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 500 and user equipment device 501 may receive content and data via input/output (I/O) path (e.g., circuitry) 502. I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 6 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the rendering application stored in memory (e.g., storage 508). Specifically, control circuitry 504 may be instructed by the rendering application to perform the functions discussed above and below. In some implementations, processing or actions performed by control circuitry 504 may be based on instructions received from the rendering application.

In client/server-based embodiments, control circuitry 504 may include communications circuitry suitable for communicating with a server or other networks or servers. The rendering application may be a stand-alone application implemented on a device or a server. The rendering application may be implemented as software or a set of executable instructions. The instructions for performing any of the embodiments discussed herein of the rendering application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a device 500.

In some embodiments, the rendering application may be a client/server application where only the client application resides on device 500 (e.g., device 104), and a server application resides on an external server (e.g., server 604 and/or server 616). For example, the rendering application may be implemented partially as a client application on control circuitry 504 of device 500 and partially on server 604 as a server application running on control circuitry 611. Server 604 may be a part of a local area network with one or more of devices 500 or may be part of a cloud computing environment accessed via the internet. In a cloud computing environment, various types of computing services for performing searches on the internet or informational databases, providing encoding/decoding capabilities, providing storage (e.g., for a database) or parsing data (e.g., using machine learning algorithms described above and below) are provided by a collection of network-accessible computing and storage resources (e.g., server 604 and/or edge computing device 616), referred to as "the cloud." Device 600 may be a cloud client that relies on the cloud computing capabilities from server 604 to determine whether processing (e.g., at least a portion of virtual background processing and/or at least a portion of other processing tasks) should be offloaded from the mobile device, and facilitate such offloading. When executed by control circuitry of server 604 or 616, the rendering application may instruct control 611 or 618 circuitry to perform processing tasks for the client device and facilitate the encoding/decoding.

Control circuitry 504 may include communications circuitry suitable for communicating with a server, edge computing systems and devices, a table or database server, or other networks or servers. The instructions for carrying out the above-mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as rendering application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of user equipment 500. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive video encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, SLM head mounted display, or any other suitable equipment for displaying visual images. A video card or graphics card may generate the output to the display 512. Audio output equipment 514 may be provided as integrated with other elements of each one of device 500 and equipment 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. Camera 518 may be an analog camera that converts to digital images via a video card.

The rendering application may be implemented using any suitable architecture. For example, it may be a stand-alone application wholly-implemented on each one of user equipment device 500 and user equipment device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide encoding/decoding functionality and preform any of the actions discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the rendering application is a client/server-based application. Data for use by a thick or thin client implemented on each one of user equipment device 500 and user equipment device 501 may be retrieved on-demand by issuing requests to a server remote to each one of user equipment device 500 and user equipment device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

In some embodiments, the rendering application may be downloaded and interpreted or otherwise run by an interpreter or virtual machine (run by control circuitry 504). In some embodiments, the rendering application may be encoded in the ETV Binary Interchange Format (EBIF), received by control circuitry 504 as part of a suitable feed, and interpreted by a user agent running on control circuitry 504. For example, the rendering application may be an EBIF application. In some embodiments, the rendering application may be defined by a series of JAVA-based files that are received and run by a local virtual machine or other suitable middleware executed by control circuitry 504. In some of such embodiments (e.g., those employing MPEG-2 or other digital media encoding schemes), rendering application may be, for example, encoded and transmitted in an MPEG-2 object carousel with the MPEG audio and video packets of a program.

FIG. 6 is a diagram of an illustrative system 600 for encoding/decoding, in accordance with some embodiments of this disclosure. User equipment devices 607, 608, 610 (e.g., which may correspond to one or more of computing device 500 or 501 may be coupled to communication network 606). Communication network 606 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 606.

System 600 may comprise media content source 602, one or more servers 604, and one or more edge computing devices 616 (e.g., included as part of an edge computing system, such as, for example, managed by mobile operator 206). In some embodiments, the rendering application may be executed at one or more of control circuitry 611 of server 604 (and/or control circuitry of user equipment devices 607, 608, 610 and/or control circuitry 618 of edge computing device 616). In some embodiments, data structure 300 of FIG. 3, may be stored at database 605 maintained at or otherwise associated with server 604, and/or at storage 622 and/or at storage of one or more of user equipment devices 607, 608, 610.

In some embodiments, server 604 may include control circuitry 611 and storage 614 (e.g., RAM, ROM, Hard Disk, Removable Disk, etc.). Storage 614 may store one or more databases. Server 604 may also include an input/output path 612. I/O path 612 may provide encoding/decoding data, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically control circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 614). Memory may be an electronic storage device provided as storage 614 that is part of control circuitry 611.

Edge computing device 616 may comprise control circuitry 618, I/O path 620 and storage 622, which may be implemented in a similar manner as control circuitry 611, I/O path 612 and storage 624, respectively of server 604. Edge computing device 616 may be configured to be in communication with one or more of user equipment devices 607, 608, 610 and video server 604 over communication network 606, and may be configured to perform processing tasks (e.g., encoding/decoding) in connection with ongoing processing of video data. In some embodiments, a plurality of edge computing devices 616 may be strategically located at various geographic locations, and may be mobile edge computing devices configured to provide processing support for mobile devices at various geographical regions.

Figure 7:
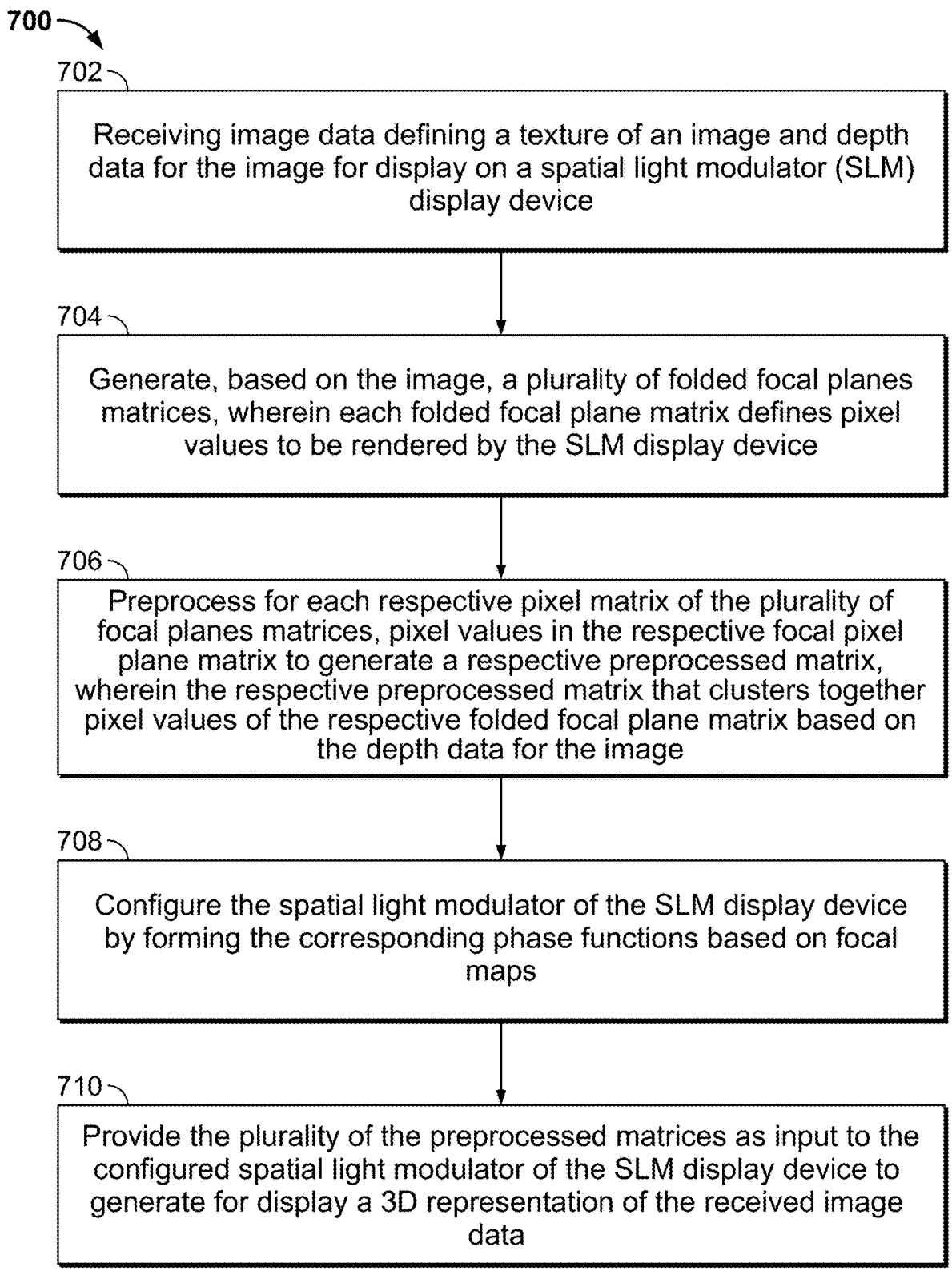
FIG. 7 is a flowchart of an illustrative process for rendering an image, in accordance with some embodiments of this disclosure.

FIG. 7 is a flowchart of an illustrative process 700 for rendering a 3D image. In various embodiments, the individual steps of process 700 may be implemented by one or more components of the devices and systems of FIGS. 4A, 4B, and 5-6. Although the present disclosure may describe certain steps of the process (and of other processes described herein) as being implemented by certain components of the devices and systems of FIGS. 4A, 4B, and 5-6, this is for purposes of illustration only, and it should be understood that other components of the devices and systems of FIGS. 5-6 may implement those steps instead.

At step 702, input/output circuitry of a computing device receives image data defining a texture of an image and depth data for the image for display on a spatial light modulator (SLM) device (e.g., data 120, 122). The input/output circuitry may receive the data from an external device and/or from internal storage.

At step 704, the control circuitry of computing device generates, based on the image data, a plurality of folded focal planes matrices, wherein each folded focal plane matrix defines pixel values for rendering by an SLM device. For example, control circuitry of the computing device may execute a depth blending algorithm to generate data defining pixel luminance values for multiple focal planes based on data defining voxel positions for a three-dimensional object. The data defining multiple focal planes comprises data defining, for each of the focal planes, locations in two-dimensional space, pixel luminance values, and pixel color values for a plurality of pixels in the focal plane.

At step 706, for each respective pixel matrix of the plurality of focal planes matrices, the control circuitry of computing device, preprocesses pixel values in the respective focal pixel plane matrix to generate a respective preprocessed matrix, wherein the respective preprocessed matrix clusters together pixel values of the respective focal plane matrix based on the depth data for the image. The preprocessing may include organizing pixel values to minimize the total distance between translated pixels in the reorganized matrix that used to be proximate in the original pixel data. The preprocessing may include upscaling the initial pixel matrices or upscaling the reorganized matrix.

At step 708, the control circuitry of computing device generates phase functions for a spatial light modulator of the SLM device (e.g., display 512), based on a plurality of the preprocessed matrices, and configures the spatial light modulator of the SLM device in accordance with the generated phase functions. The SLM device may be configured to reverse preprocessing of step 706 (and/or reorganizing and upscaling). For example, at step 710, the input/output circuitry of the computing device may provide the plurality of the preprocessed matrices as input to the configured spatial light modulator of the SLM device to generate for display a 3D representation of the received image data (e.g., on head mounted 3D display 512).

Figure 8:
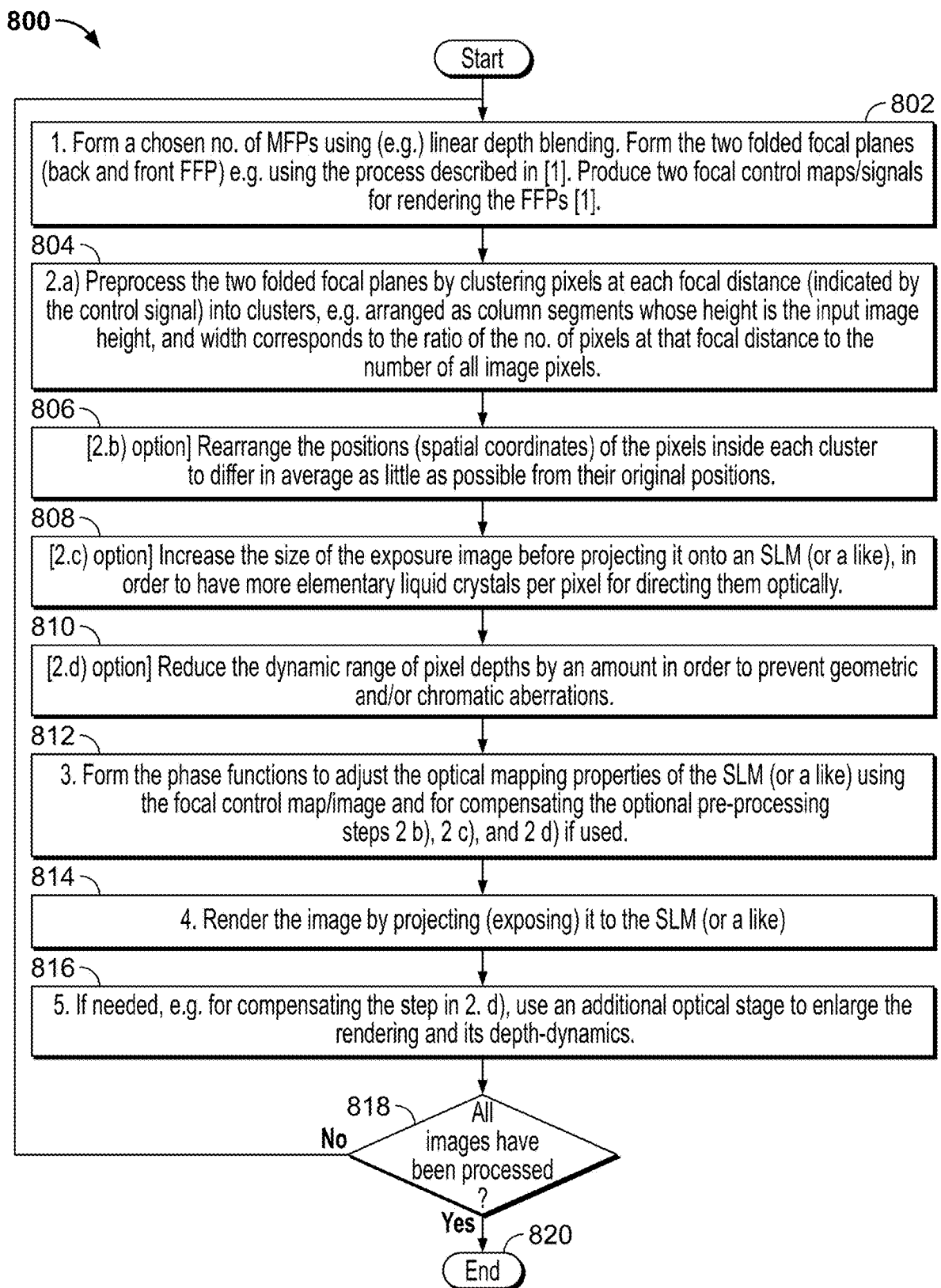
FIG. 8 is another flowchart of illustrative process for rendering an image, in accordance with some embodiments of this disclosure.

FIG. 8 is a flowchart of an illustrative process 800 for rendering a 3D image. In various embodiments, the individual steps of process 800 may be implemented by one or more components of the devices and systems of FIGS. 4A, 4B, and 5-6. Although the present disclosure may describe certain steps of the process (and of other processes described herein) as being implemented by certain components of the devices and systems of FIGS. 4A, 4B, and 5-6, this is for purposes of illustration only, and it should be understood that other components of the devices and systems of FIGS. 5-6 may implement those steps instead. Some steps of process 800 may be optional. Steps of process 800 may be performed in any suitable order.

Process 800 begins at step 800. For example, process 800 may begin when a user interface request display of a 3D video or a 3D video game.

At step 802, the control circuitry forms a chosen number of MFPs matrices using (e.g. using linear depth blending as described in FIG. 1B). For example, two folded focal planes (back and front FFPs) may be formed using the process (e.g., images 158, 160). Two focal control maps may also be produced (e.g., data 162).

At step 802, the control circuitry may preprocess the two folded focal planes matrices by clustering pixels at each focal distance (indicated by the control signal) into clusters in respective preprocessed matrices. For example, the pixels may be arranged as column segments whose height is the input image height, and width corresponds to the ratio of the number of pixels at that focal distance to the number of all image pixels.

At step 804, the control circuitry rearranges the positions (spatial coordinates) of the pixels inside each cluster of the reorganized matrix to differ in average as little as possible from their original positions in the initial focal planes matrices.

At step 806, the control circuitry increases the size of the exposure reorganized matrix before projecting it onto an SLM (or any suitable 3D monitor), in order to have more elementary liquid crystals per pixel for directing the pixels optically.

At step 808, the control circuitry reduces the dynamic range of pixel depths in order to prevent geometric and/or chromatic aberrations. For example, the reduction may be in accordance with known or manufacture-provided limitations of the SLM device.

At step 812, the control circuitry computes the phase functions to adjust the optical mapping properties of the SLM device (or any suitable 3D monitor) using the focal control map/image generated at step 804 (and a mapping of rearranged pixels back to matrices formed at step 802). The phase functions may also compensate the optional preprocessing in steps 806 and/or 808.

At step 814, input/output circuitry renders an image by projecting rearranged matrices (e.g., after tiling) proceed at step 804 into the SLM device (or any suitable 3D monitor) that has been configured using phase function of step 812 to produce a rendering or original image processed in step 802.

At step 818, the control circuitry checks if all images have been processed (e.g., all 3D frames of a 3D video). If not, the process repeats for next frame at stop 802. Otherwise, the process 800 ends at step 820.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    receiving image data defining a texture of an image and depth data for the image for display on a spatial light modulator (SLM) device;
    generating, based on the image data, a plurality of folded focal planes matrices, wherein each folded focal plane matrix defines pixel values to be rendered by the SLM device;
    for each respective pixel matrix of the plurality of folded focal planes matrices:
        preprocessing pixel values in the respective folded focal pixel plane matrix to generate a respective preprocessed matrix, wherein the respective preprocessed matrix clusters together pixel values of the respective folded focal plane matrix based on the depth data for the image;
    generating a plurality of phase functions for a spatial light modulator of the SLM device, based on a plurality of the preprocessed matrices;
    configuring the spatial light modulator of the SLM device in accordance with the generated phase functions; and
    providing the plurality of the preprocessed matrices as input to the configured spatial light modulator of the SLM device to generate for display a 3D representation of the received image data.

2. The method of claim 1, wherein providing the plurality of the preprocessed folded focal plane matrices as input causes a generation of light rays based on the plurality of reorganized matrices.

3. The method of claim 2, wherein the configuring the spatial light modulator of the SLM device in accordance with the generated phase functions comprises:
    configuring the spatial light modulator to optically adjust light produced by the display of the plurality of preprocessed matrices based on the phase functions.

4. The method of claim 3, wherein the spatial light modulator is configured to optically reverse preprocessing of the plurality of the preprocessed matrices to recover the representation of the received image data.

5. The method of claim 1, wherein the preprocessing pixel values in the respective focal pixel plane matrix to generate the respective preprocessed matrix comprises:
    collecting pixel values indicated by the depth data to be on the same depth in respective polygonal regions of the respective reorganized matrix.

6. The method of claim 1, wherein the preprocessing pixel values in the respective focal pixel plane matrix to generate the respective reorganized matrix comprises:
    ordering pixel values using a machine learning algorithm, that was trained to penalize an increase in distance in the respective reorganized matrix between pixels that were adjacent in the respective focal pixel plane matrix.

7. The method of claim 6,
    wherein the machine learning algorithm is trained using a self-organized map (SOM) machine learning technique.

8. The method of claim 1, wherein size of the respective preprocessed matrix is increased from size of the respective folded focal pixel plane matrix.

9. The method of claim 8, wherein the spatial light modulator is configured to optically reverse the increase in size of the respective preprocessed matrix.

10. The method of claim 1, wherein generating the plurality of folded focal planes matrices, comprises folding a first set of focal planes matrices into a reduced number of folded focal planes matrices.

11. The method of claim 1, wherein the depth range of the focal map controlling the spatial light modulator is reduced before displaying the plurality of reorganized matrices.

12. A system comprising:
    control circuitry configured to:
        receive image data defining a texture of an image and depth data for the image for display on a spatial light modulator (SLM) device;
        generate, based on the image data, a plurality of folded focal planes matrices, wherein each folded focal plane matrix defines pixel values to be rendered by the SLM device;
        for each respective pixel matrix of the plurality of folded focal planes matrices:
            preprocess pixel values in the respective folded focal pixel plane matrix to generate a respective preprocessed matrix, wherein the respective preprocessed matrix clusters together pixel values of the respective folded focal plane matrix based on the depth data for the image;
        generate a plurality of phase functions for a spatial light modulator of the SLM device, based on a plurality of the preprocessed matrices;
        configure the spatial light modulator of the SLM device in accordance with the generated phase functions; and
    input/output circuitry configured to:
        providing the plurality of the preprocessed matrices as input to the configured spatial light modulator of the SLM device to generate for display a 3D representation of the received image data.

13. The system of claim 12, wherein the input/output circuitry providing the plurality of the preprocessed folded focal plane matrices as input causes a generation of light rays based on the plurality of reorganized matrices.

14. The system of claim 13, wherein the control circuitry is configured to configure the spatial light modulator of the SLM device in accordance with the generated phase functions by:
    configuring the spatial light modulator to optically adjust light produced by the display of the plurality of preprocessed matrices based on the phase functions.

15. The system of claim 14, wherein the spatial light modulator is configured to optically reverse preprocessing of the plurality of the preprocessed matrices to recover the representation of the received image data.

16. The system of claim 12, wherein the control circuitry is configured to preprocess pixel values in the respective focal pixel plane matrix to generate the respective preprocessed matrix by:
    collecting pixel values indicated by the depth data to be on the same depth in respective polygonal regions of the respective reorganized matrix.

17. The system of claim 12, wherein the control circuitry is configured to preprocess pixel values in the respective focal pixel plane matrix to generate the respective reorganized matrix by:

ordering pixel values using a machine learning algorithm, that was trained to penalize an increase in distance in the respective reorganized matrix between pixels that were adjacent in the respective focal pixel plane matrix.

18. The system of claim 17, wherein the machine learning algorithm is trained using a self-organized map (SOM) machine learning technique.

19. The system of claim 12, wherein size of the respective preprocessed matrix is increased from size of the respective folded focal pixel plane matrix.

20. The system of claim 19, wherein the spatial light modulator is configured to optically reverse the increase in size of the respective preprocessed matrix.

\* \* \* \* \*